May 21, 1963   A. P. PROVENZANO ETAL   3,090,075
EXTRUDER DIE
Filed June 8, 1959

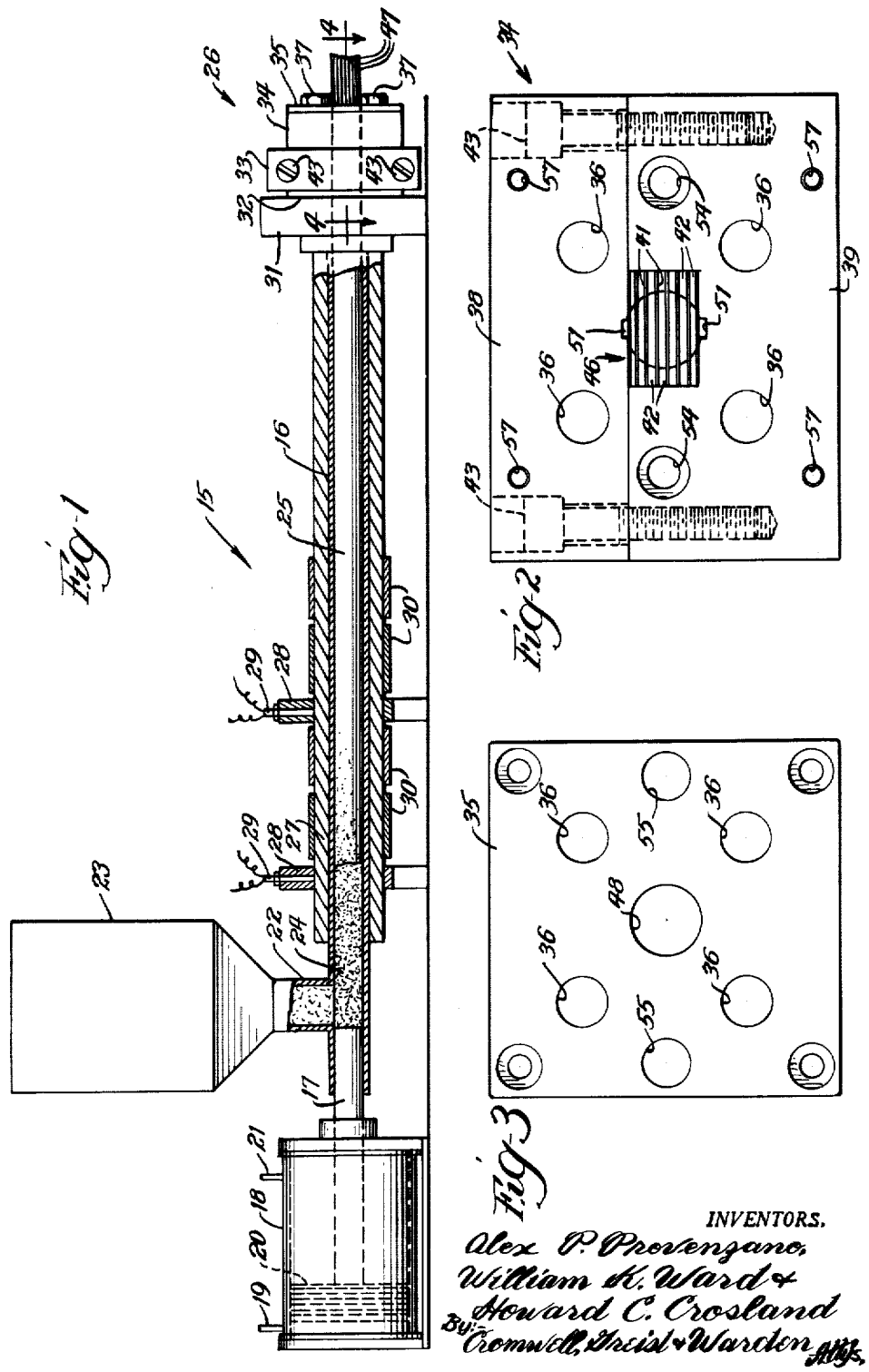

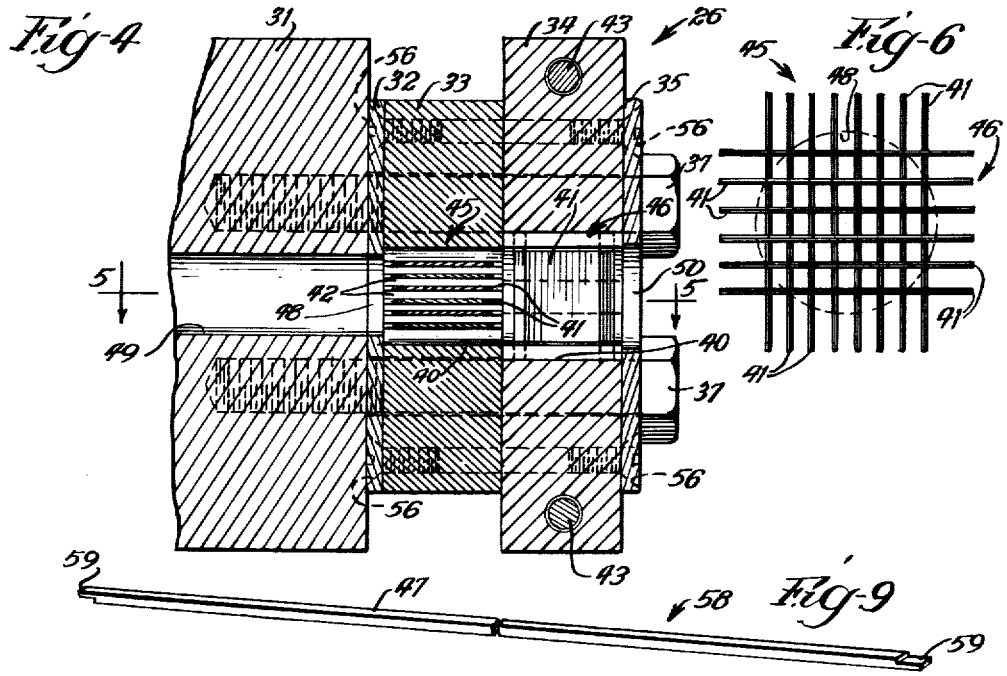
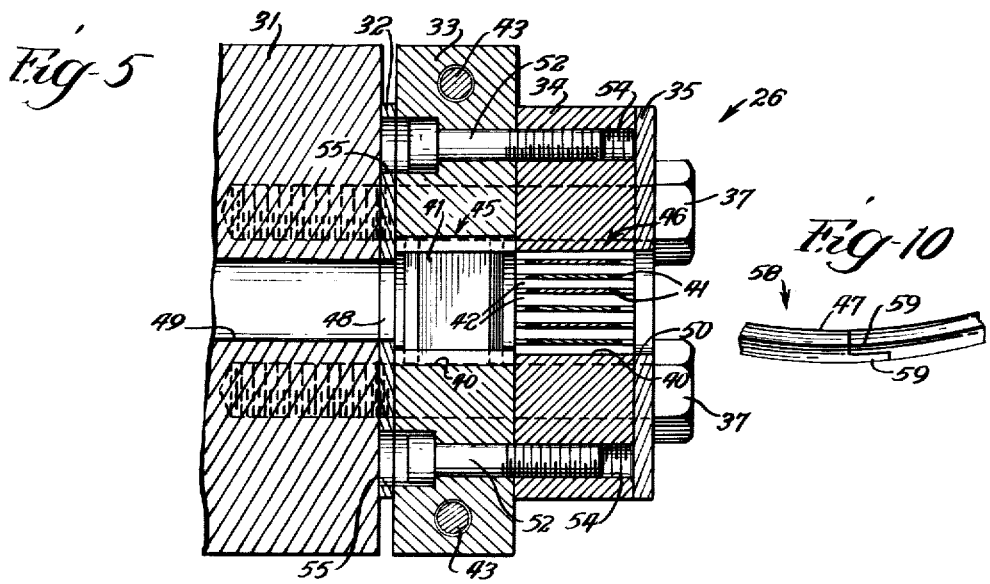

INVENTORS.
Alex P. Provenzano,
William K. Ward &
By Howard C. Crosland
Cromwell Greist & Warden Attys.

United States Patent Office  3,090,075
Patented May 21, 1963

3,090,075
EXTRUDER DIE
Alex P. Provenzano, River Grove, William K. Ward, Elgin, and Howard C. Crosland, Glen Ellyn, Ill., assignors to Chicago Rawhide Manufacturing Company, Chicago, Ill., a corporation of Illinois
Filed June 8, 1959, Ser. No. 818,798
2 Claims. (Cl. 18—12)

The present invention is directed to a new and improved extruder die assembly for use in forming thin strips of thermosetting plastic material, such as polytetrafluoroethylene, from solid rod-like members thereof, the die being particularly adapted for operational use with a continuously formed, uninterrupted element of a plastic material.

While in describing the structural details and operational use of the extruder die of the present invention, reference will be made in particular to the forming of thin strips of polytetrafluoroethylene plastic material, and it will be understood that the extruder die is also adapted for use with any suitable material in sub-dividing rod-like solid elements in a continuous manner. The commercial usage of polytetrafluoroethylene resin has expanded greatly and this resin is utilized to a material extent in forming oil seal elements as well as gaskets, washers and the like. Sintered polytetrafluoroethylene may be used to advantage in many oil seal applications due to its desirable properties including chemical inertness, heat resistance, toughness, etc. Polytetrafluoroethylene is also self-lubricating to a degree which can be of importance in the utilization thereof in forming components of oil seals as well as gaskets and washers.

The shaping of the polytetrafluoroethylene elements is normally obtained by compressing powdered resin in a shaping die with the compression forces ranging, for example, anywhere from 2,000 to 15,000 p.s.i. The compressed and molded article is then adequately self-sustaining to permit transferring thereof to an oven wherein the article is sintered at temperatures in the neighborhood of 700° F. Circumferentially continuous gaskets and washers have been made in this manner but it has been found commercially impractical to form thin cross section washers and gaskets by following this procedure. Cross sections of 0.125 of an inch and less cannot be obtained with the requisite degree of uniformity by molding the individual gaskets in the manner described. Automatic machinery designed for delivering the powdered resin into the mold cavity is not capable of uniformly dispersing the resin throughout the cavity to assure uniform cross section production throughout the entire circumferential length of the gasket. Furthermore, it has been found commercially impractical to continuously extrude sintered thin sections of polytetrafluoroethylene from which gaskets can be formed. Here again, the extrusion of strips having cross sections of 0.125 inch or less is incapable of providing adequate uniformity for commercial purposes.

It is an object of the present invention to provide a new and improved extruder die for use in forming thin strips of thermosetting plastic material, such as polytetrafluoroethylene, the strips being sliced by the die from rod-like elements of pre-formed plastic material.

A further object is to provide a new and improved extruder die for use in sub-dividing a sintered rod-like polytetrafluoroethylene element, the die forming a part of extrusion apparatus which operates to continuously shape, compress and sinter the rod-like element, the forming and delivery pressure provided by the assembly moving the element through the extruder die of the present invention resulting in automatic and continuous sub-division of the element.

Another object of the present invention is to provide a new and improved extruder die of the type described utilizing a pair of juxtaposed spaced blade complements arranged relative to one another for cooperatively subdividing a solid member into a plurality of thin strips upon movement of the member therethrough, the invention further involving the method of forming thin strips of sintered polytetrafluoroethylene in a continuous and uniform manner.

Other objects not specifically set forth will become apparent from the following detailed description of the present invention made in conjunction with the drawings wherein:

FIGURE 1 is a fragmentary section of a continuously operating extruder assembly having attached thereto the new and improved extruder die of the present invention;

FIGURE 2 is an enlarged face elevation of one of the blade mounting plates forming a part of the extruder die;

FIGURE 3 is a face elevation of one of the cover plates of the extruder die;

FIGURE 4 is an enlarged fragmentary section of the extruder die taken generally along line 4—4 in FIGURE 1;

FIGURE 5 is a fragmentary section of the extruder die taken generally along line 5—5 in FIGURE 4;

FIGURE 6 is an enlarged diagrammatic illustration of the arrangement of the cutting blades forming a part of the extruder die;

FIGURE 9 is a fragmentary perspective of a finished strip of plastic material prepared for gasket formation; and FIGURE 10 is an enlarged fragmentary perspective of the joining of the opposite ends of the strip of FIGURE 9 in forming a finished gasket.

Figure 7:
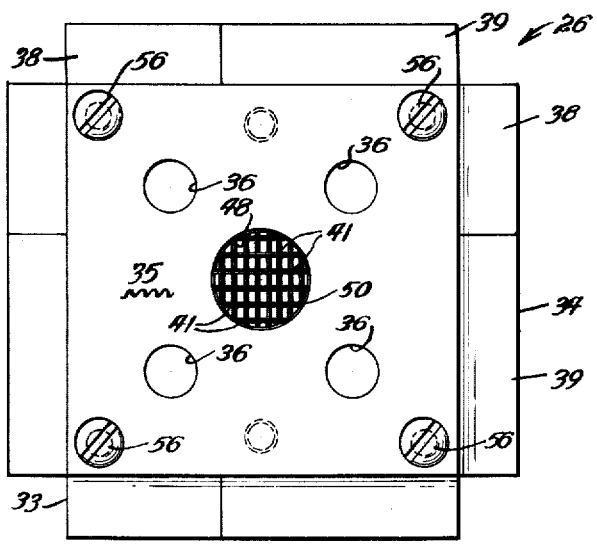
FIGURE 7 is an end elevation of the assembled extruder die.

FIGURE 1 illustrates a "ram" type extrusion assembly 15 including a barrel die 16 of cylindrical shape having a pneumatically operated ram 17 received in one end thereof. The ram 17 is operated from an air cylinder 18 having an air inlet and exhaust connection 19 communicating with the rear face of a piston member 20 to which the ram 17 is attached and which reciprocates within the cylinder 18 between the air connection 19 and an air inlet and exhaust connection 21. Inwardly of the ram end of the barrel 16 is a material delivery connection 22 having a material supply hopper 23 attached thereto. Powdered polytetrafluoroethylene 24 is delivered from the hopper 23 into the barrel 16 and the ram 17 reciprocates to continuously compress the powdered resin into rod shape. In this manner, a continuous, uniform rod-like element 25 of polytetrafluoroethylene is formed in the barrel 16 and delivered outwardly of the opposite end thereof to which is suitably attached the extruder die 26 of the present invention.

The barrel 16 is received in a sleeve-like casing 27 which has attached thereto support means 28 which support the hopper end of the barrel. These support means may includes housings in which thermocouples 29 are received for temperature measurement purposes. To sinter the compressed rod-like element 25, the casing 27 has received thereabout a plurality of heating elements 30 which may be of any suitable type. These heating elements are located to raise the temperature of the compressed powder to commence sintering of the powder to the hard finished form at a point just beyond the fully extended end of the ram 17. As the temperature increases during continued movement of the element 25 through the barrel 16, sintering is completed before discharge of the element from the opposite end of the barrel. The temperature is raised to around 700° F. and the element is held at this temperature for a sufficient length of time to complete sintering thereof. The opposite discharge end of the barrel 16 is suitably supported by an end support housing 31.

The extruder die 26 includes an inner cover plate 32, an inner blade mounting plate 33, an outer blade mounting plate 34 and an outer cover plate 35. Each of these plates includes horizontally aligned apertures 36 through which extruder die assembly bolts 37 are received and threadedly engaged in the end support 31 as particularly shown in FIGURES 4 and 5.

Each of the blade mounting plates 33 and 34 are identical in construction with the exception of one variation be described. For purposes of understanding the main structural features of each of these plates, reference is made particularly to FIGURE 8.

Figure 8:
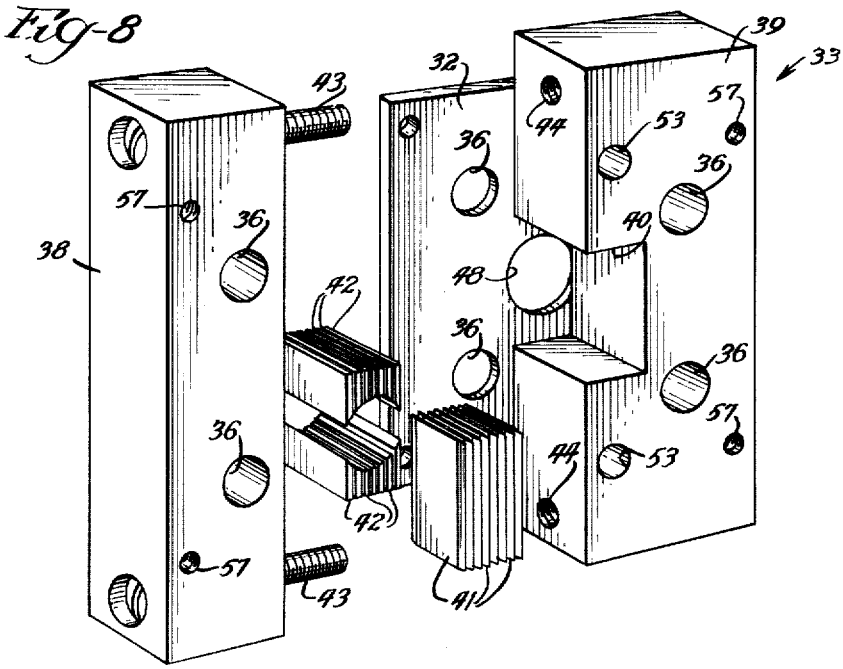
FIGURE 8 is an exploded perspective of one of the blade mounting plates in association with one of the cover plates.

The blade mounting plate 33 of FIGURE 8 is centrally apertured as defined by a pair of detachably connected half plate sections 38 and 39. The section 39 is of greater width than the section 38 as the inner marginal portion thereof is centrally grooved to define a blade mounting cavity 40. This cavity is of generally block U-shape with the juxtaposed surface of the plate section 38 enclosing the open side of the same when the plate sections are brought together. A plurality of spaced flat blades 41 are mounted in the cavity 40 in a direction extending across the cavity 40 parallel to the juxtaposed cavity enclosing surface of the plate section 38. To hold the blades 41 in spaced relation within the cavity 40, a plurality of spacers 42 are received therebetween, these spacers being supplied in two separate sets as particularly shown in FIGURE 8 to be placed in engagement with opposite end portions of the blades 41 and in abutment with opposite surfaces of the cavity 40. The spacer elements 42 are of variable length in each set thereof to conform in combined relation to the outer configuration of the rod-like element 25 of sintered polytetrafluoroethylene. This is particularly shown in FIGURE 8 wherein it will be appreciated that the inner surfaces of the spacers 42 of each set combine to define a concave area of arc-like configuration.

The blades or knives 41 are of tooled steel capable of withstanding the sintering temperature of the polytetrafluoroethylene. Opposite edges of each blade 41 are beveled to sharpen the same to a fine edge for sub-division of the element 25 as it is moved through the extruder die 26. It will be appreciated that only the leading edges of the blades 41 need be sharpened for the purposes described, but for ease of installation and to prevent error during assembly of the various components of the die, it is preferred that both opposite edges of each blade be sharpened.

In assembling each blade mounting plate 33 and 34, alternate blades and spacers are placed in the blade mounting cavity 40 and upon completion of this portion of the assembling operation, the plate section 38 is brought into covering and closing relation with the cavity 40. The plate section 38 is provided with a pair of bolts 43 which are threadedly received in suitable tapped openings 44 in the plate section 39. Threaded advancement of the bolts 43 in the openings 44 draws the plate sections 38 and 39 together in tight cavity enclosing relation to releasably hold the blade assembly including the spacers 42 in operative position.

Each assembled blade mounting plate 33 and 34 carries a blade or knife grid generally designated by the numeral 45 for the blade mounting plate 38 and by the numeral 46 for the blade mounting plate 34. Upon completion of the assembling of each of the blade mounting plates 33 and 34, the fully assembled blade mounting plate 34 being illustrated in FIGURE 2, the same are placed in face-to-face relation and with one of the plates rotated 90° relative to the other to place the grid thereof at right angles in a longitudinal direction to the grid of the adjacent plate. This arrangement is particularly illustrated in FIGURES 4 and 5 and the result is diagrammatically shown in FIGURE 6. By this arrangement, a plurality of grid openings between adjacent blades and of rectangular configuration are formed by the combined grids with the result that the element 25 upon extrusion through the die 26 is sub-divided into a plurality of thin strips 47 as shown in FIGURE 1. The rod 25 is continuously sub-divided longitudinally thereof and, in effect the same is stripped into very thin sections.

To complete the extruder die assembly, the inner and outer cover plates 32 and 35 are provided. Each of these plates, as particularly shown in FIGURE 3 wherein the plate 35 is illustrated, includes a central aperture 48 which is of a diameter equal to the inner diameter of the barrel 16 and the rod element delivery passage 49 (FIGURES 4 and 5) of the end support housing 31. The plate 32 functions to receive through the central opening 48 thereof the rod-like element 25 for guiding the same through the combined blade grids 45 and 46. As particularly shown in FIGURES 4 and 5, the opening 48 overextends the grid 45 to prevent axial displacement of the blades thereof when the extruder die is assembled.

Similarly, the outer cover plate 35 is provided with a central opening 50 which is of slightly greater diameter than the opening 48 of the inner plate 35 to accommodate the sub-divided element 25 to permit movement thereof out of the extruder die 26. It will be appreciated that upon slicing of the element 25, the over-all diameter of the same will increase and the diameter of the opening 50 is adequate to accommodate this increased element diameter. To further permit full utilization of all of the blades 41 in the blade mounting plate 34, opposite surfaces of the cavity 40 therein as shown in FIGURE 2 are provided with inwardly opening clearance grooves 51. Thus the outermost blades 41 may be utilized in stripping a section from the element 25 with the space afforded by the clearance grooves 51 accommodating the newly formed strip.

As particularly shown in FIGURE 5, the blade mounting plates 33 and 34 are attached in operative relation by threaded fasteners 52 which extend through openings 53 in the plate section 39 of the blade mounting plate 33 and into threaded openings 54 in the blade mounting plate 34. The cover plate 35, as shown in FIGURES 3 and 5, is provided with drilled openings 55 through which the heads of the fasteners 52 are accessible for tightening or withdrawal of the fasteners. Each of the cover plates 32 and 35 are suitably attached to adjacent blade mounting plates by machine screws 56 (see FIGURES 4 and 7). Suitable tapped openings 57 are provided in the blade mounting plates 33 and 34 for this purpose.

Complete assembly of the extruder die 26 presents an end face view of the combined grids as shown in FIGURE 7. Through these combined grids the sintered polytetrafluoroethylene rod-like element 26 is continuously forced by operation of the ram 17. In referring again to FIGURE 1, it will be noted that the heating elements 30 are located at a distance away from the extruder die 26. The purpose of this relative positioning is to permit controlled cooling of the element 25 to temperatures below the sintering temperature of polytetrafluoroethylene so as to place the element at a transition temperature at the time that the same is sub-divided in the extruder die 26. Sintered polytetrafluoroethylene exhibits a transition stage in which it is semi-plastic and more readily workable at a temperature of around 620° F. Accordingly, it is preferred that the temperature of the element 25 upon entry into the extruder die 26 be around the transition temperature of polytetrafluoroethylene. Under these circumstances, the strips 47 sub-divided from the element 25 are more readily controlled as to dimensions and uniformity and better over-all results are obtained.

FIGURE 9 illustrates a finished polytetrafluoroethylene strip 58 having a cross section of less than 0.125 inch. The strip 58 is used to form a suitable gasket and for this purpose the opposite ends thereof are cut for lapping to provide tongue-like portions 59 which are lapped as shown in FIGURE 10 to form a washer, gasket or the like. The sintered polytetrafluoroethylene extruded in thin sections as described is readily flexible for forming into annular shape and the lapped ends of the sections may be suitably adhesively secured to provide a finished gasket product of any suitable diameter. In this respect, it will be appreciated that the strips 47 of polytetrafluoroethylene formed by the extruder die 26 may be longitudinally separated to any desired length and thus used to form gaskets of any desired diameters.

Obviously certain modifications and variations of the invention as hereinbefore set forth may be made without departing from the spirit and scope thereof, and therefore only such limitations should be imposed as are indicated in the appended claims.

We claim:

1. An extruder die for use in froming thin strips of polytetrafluoroethylene, said die comprising means for continuously delivering a rod-like element of sintered polytetrafluoroethylene into and through a slicing member disposed transversely of the path of movement of said element, said slicing member including a pair of block-like blade mounting plates each of which is formed from detachably connected half plate sections one of which defines a rectangular blade mounting cavity recessed along an edge thereof, which edge is engaged with a mating edge of the other half plate section fully overextending said cavity, a plurality of spaced flat blades laid in said cavity and extending across the same parallel with the mating edge of said other half plate section, and spacer elements received in said cavity between opposite end portions of said blades and in engagement with the opposite end wall portions of said cavity to releasably hold with the drawing together of said plate sections said blades in said cavity, the complement of blades of one plate being arranged at right angles to that of the other plate for cooperatively sub-dividing said element into a plurality of thin strips, said blade mounting plates being received between cover plates each of which is centrally apertured with the apertures conforming to the outer configuration of said element and aligned with said blades to direct and confine said element during extrusion through said cavities, division thereof.

and heating means for maintaining said polytetrafluoroethylene in at least a partial thermoplastic state during sub- 2. An extruder die for use in forming thin strips of polytetrafluoroethylene, said die comprising means for continuously delivering a rod-like element of sintered polytetrafluoroethylene into and through a slicing member disposed transversely of the path of movement of said element, said slicing member including a pair of block-like blade mounting plates each of which is formed from detachably connected half plate sections one of which defines a rectangular blade mounting cavity recessed along an edge thereof, which edge is engaged with a mating edge of the other half plate section fully overextending said cavity, a plurality of spaced flat blades laid in said cavity and extending across the same parallel with the mating edge of said other half plate section, and spacer elements received in said cavity between opposite end portions of said blades and in engagement with the opposite end wall portions of said cavity to releasably hold with the drawing together of said plate sections said blades in said cavity, said spacer elements being of variable length toward the center of said cavity to cooperatively conform in combined relation to the outer configuration of said element, the complement of blades of one plate being arranged at right angles to that of the other plate for cooperatively sub-dividing said element into a plurality of thin strips, said blade mounting plates being received between cover plates each of which is centrally apertured with the apertures conforming to the outer configuration of said element and aligned with said blades to direct and confine said element during extrusion through said cavities, the aperture in the outermost cover plate being larger than the original transverse dimension of said element to accommodate the enlarging thereof following sub-division, and heating means for maintaining said polytetrafluoroethylene in at least a partial thermoplastic state during sub-division thereof.

References Cited in the file of this patent

UNITED STATES PATENTS

| | | |
|---|---|---|
| 534,746 | Jarves | Feb. 26, 1895 |
| 1,397,571 | Bowen | Nov. 22, 1921 |
| 2,091,125 | Stewart | Aug. 24, 1937 |
| 2,386,730 | Weiner | Oct. 9, 1945 |
| 2,791,806 | Tordella | May 14, 1957 |
| 2,838,801 | Delong et al. | June 17, 1958 |
| 2,941,240 | Distler | June 21, 1960 |
| 3,004,294 | Richard et al. | Oct. 17, 1961 |

FOREIGN PATENTS

| | | |
|---|---|---|
| 774,212 | France | Dec. 3, 1934 |

UNITED STATES PATENT OFFICE
CERTIFICATE OF CORRECTION

Patent No. 3,090,075 May 21, 1963

Alex P. Provenzano et al.

It is hereby certified that error appears in the above numbered patent requiring correction and that the said Letters Patent should read as corrected below.

Column 3, line 20, before "be" insert -- to --; column 5, line 25, for "froming" insert -- forming --; column 6, lines 1 and 2, strike out "and heating means for maintaining said polytetrafluoroethylene in at least a partial thermoplastic state during sub-", and insert the same after "cavities," in line 50, column 5.

Signed and sealed this 24th day of December 1963.

(SEAL)
Attest:
ERNEST W. SWIDER

EDWIN L. REYNOLDS

Attesting Officer

Acting Commissioner of Patents